Oct. 29, 1963  R. B. WILLIAMS, JR  3,108,648
CONDITION RESPONSIVE DEVICE
Filed Jan. 23, 1958  6 Sheets-Sheet 1
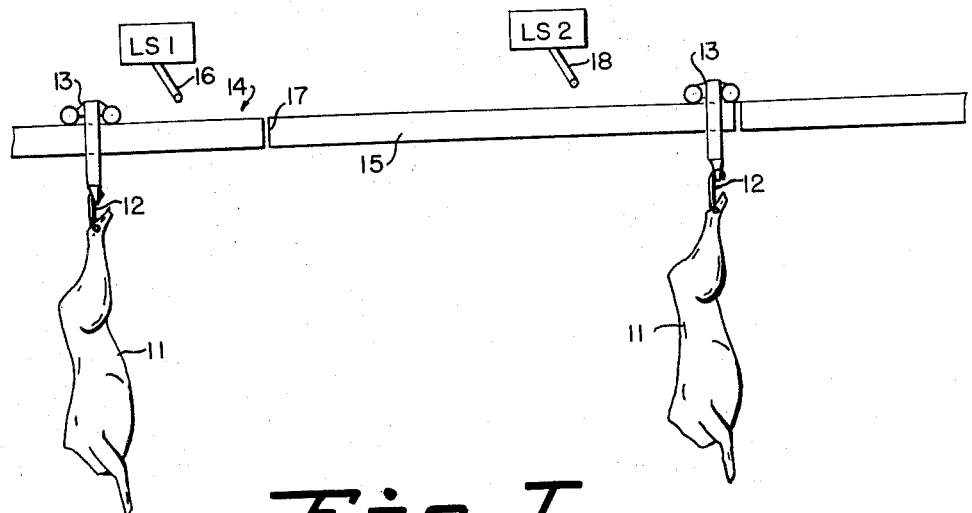
*Fig-I*
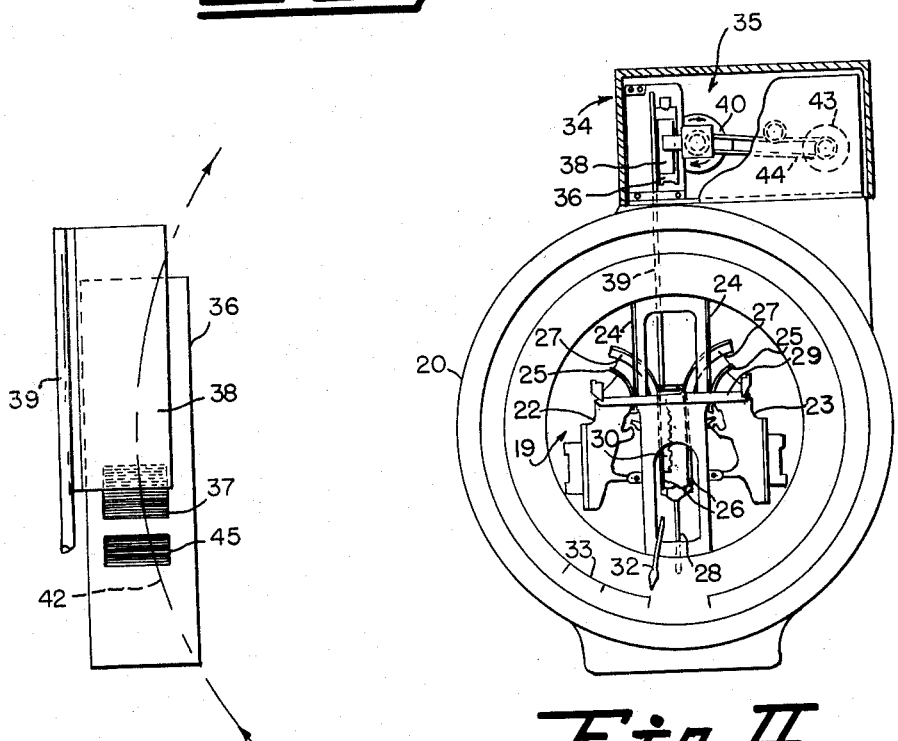
*Fig-III*  *Fig-II*
INVENTOR.
ROGER B. WILLIAMS JR.
BY
Marshall, Marshall & Heasting
ATTORNEYS

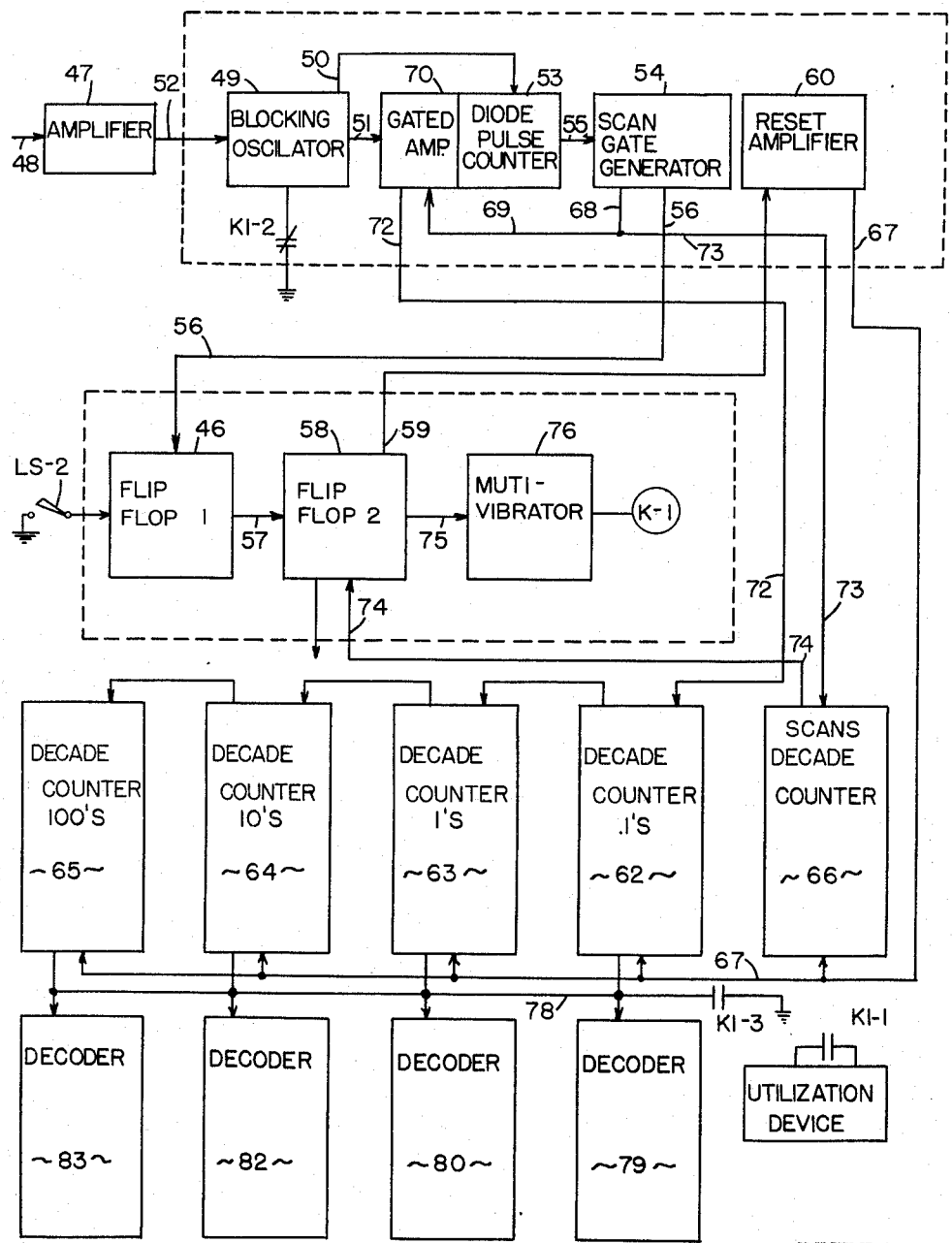
Fig. IV

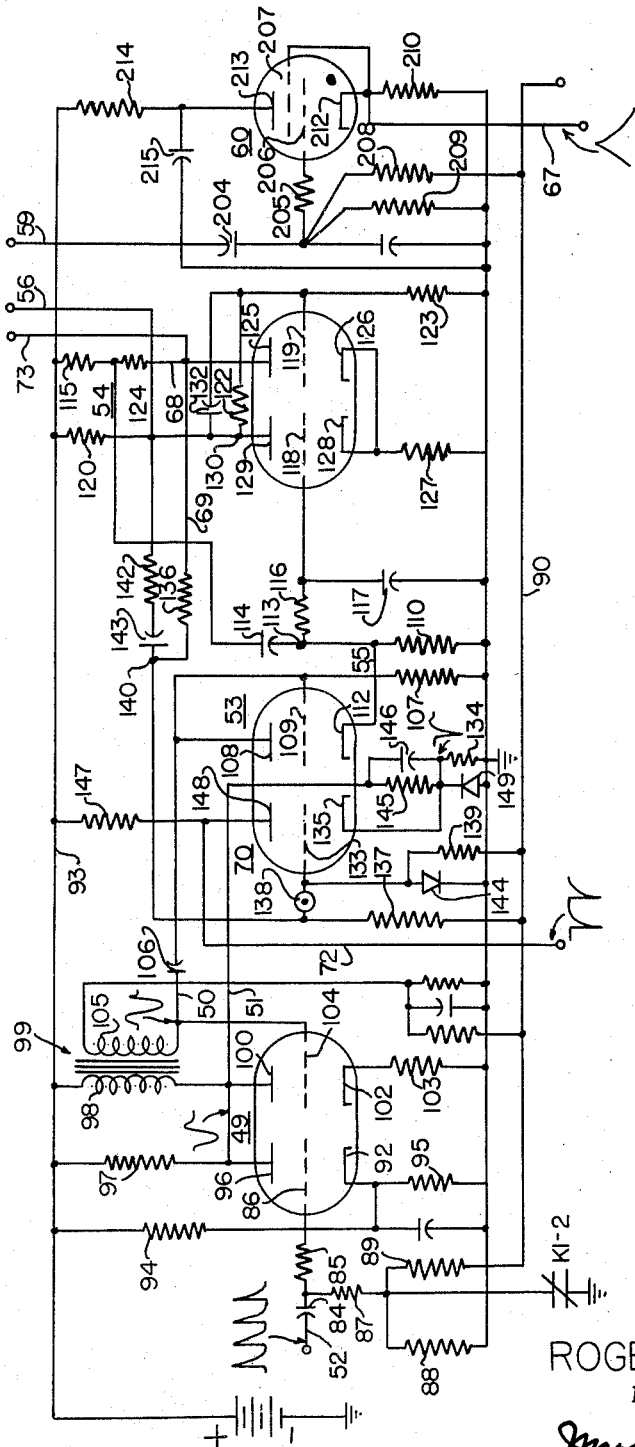

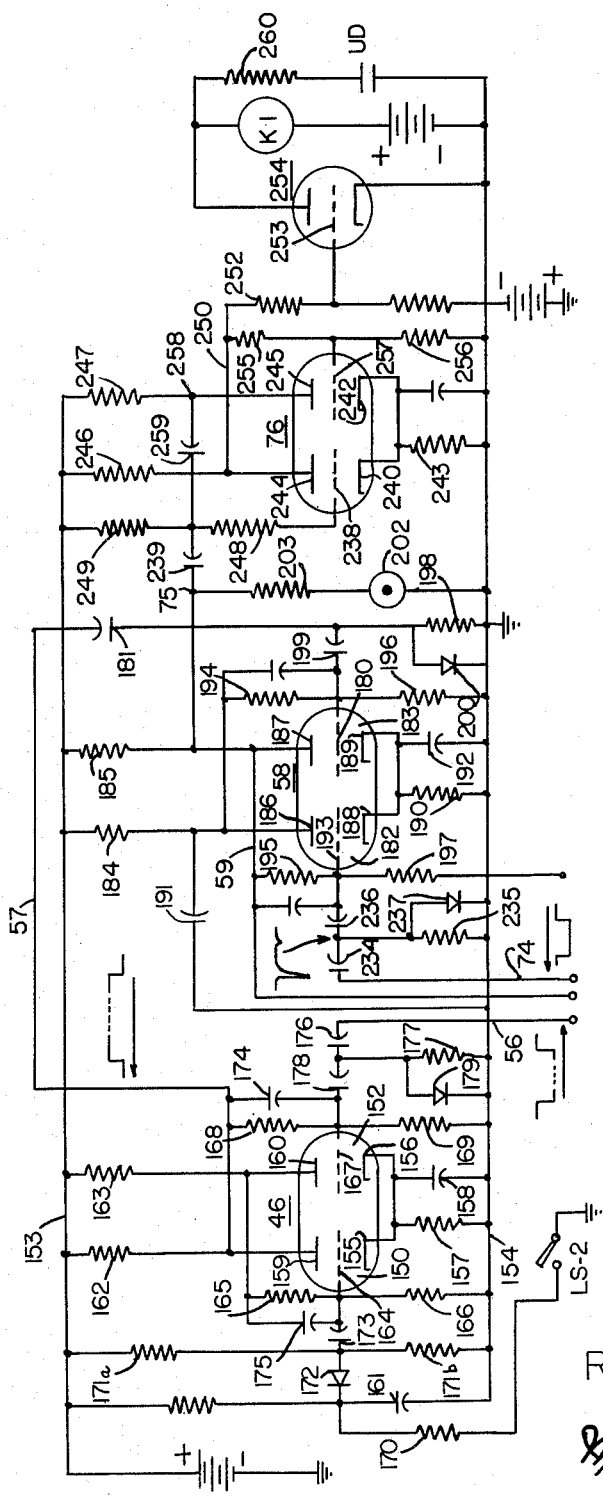
Fig. VI

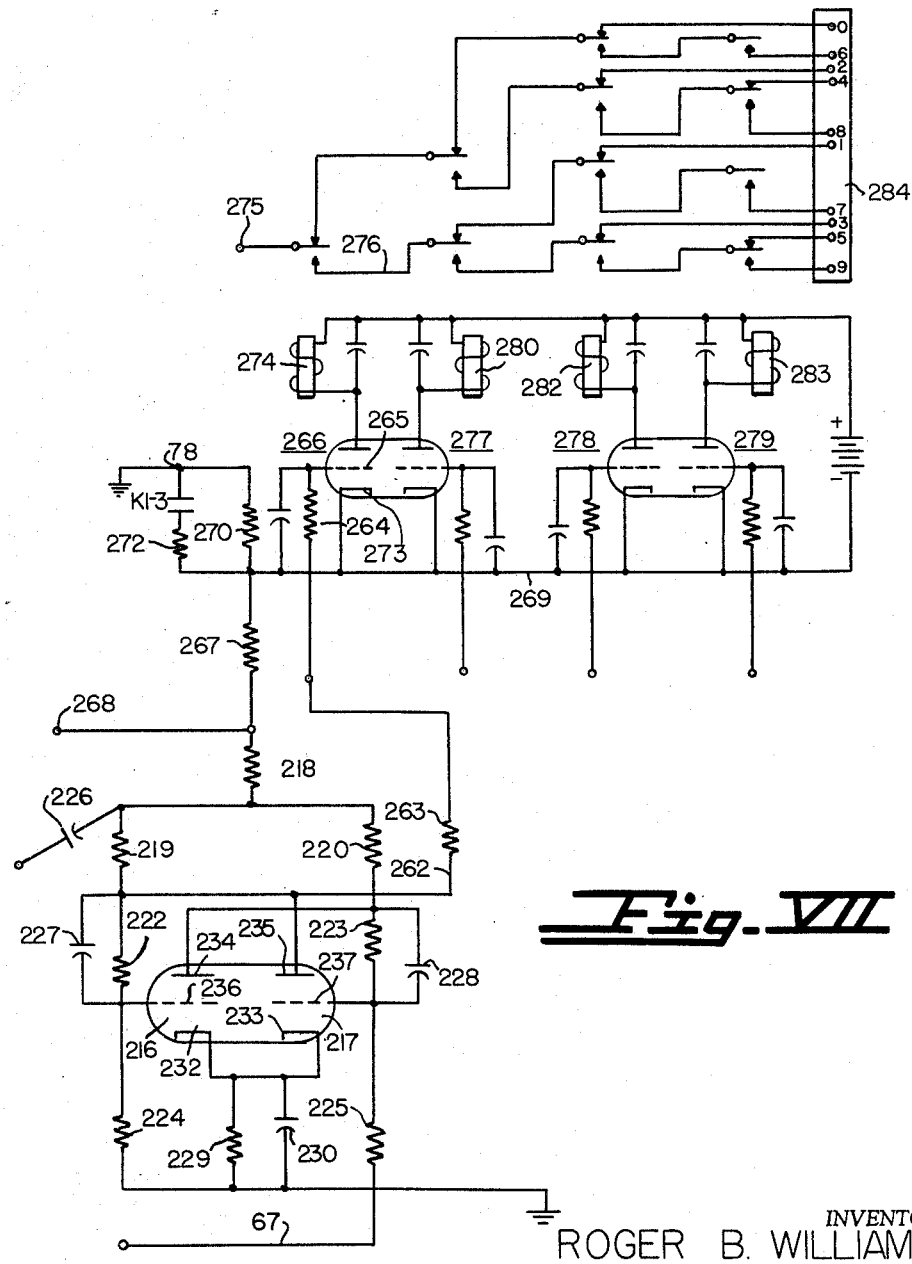
Fig. VII
INVENTOR.
ROGER B. WILLIAMS JR.

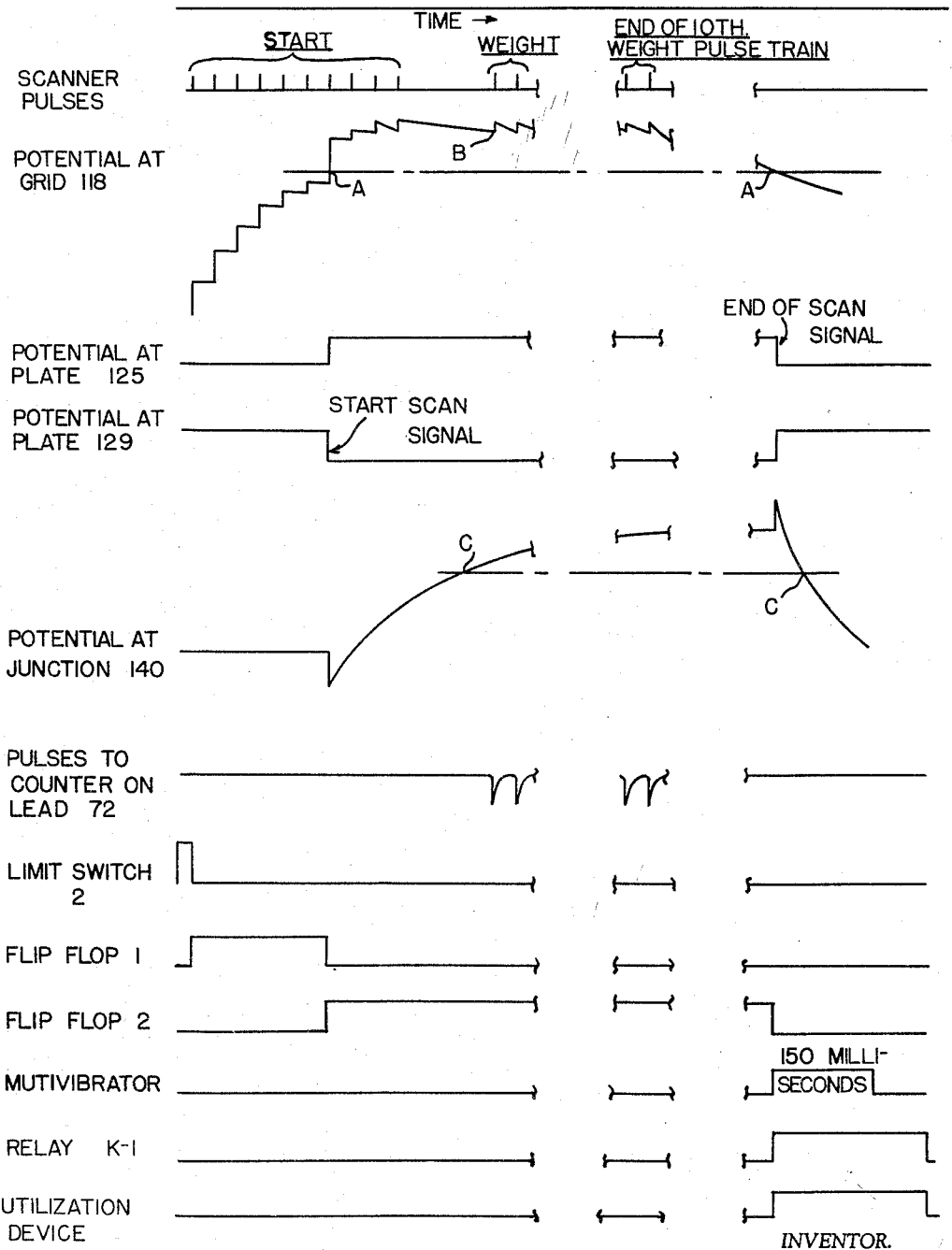
Fig. VIII

United States Patent Office 3,108,648
Patented Oct. 29, 1963

3,108,648
CONDITION RESPONSIVE DEVICE
Roger B. Williams, Jr., Toledo, Ohio, assignor to Toledo Scale Corporation, Toledo, Ohio, a corporation of Ohio
Filed Jan. 23, 1958, Ser. No. 710,795
12 Claims. (Cl. 177—3)

This invention relates to condition responsive devices and more particularly to such devices wherein the useful output therefrom is derived from an average response.

Heretofore, condition responsive devices such as weighing scales have been applied to the measurement of continuously varying or unstable conditions. In such applications various expedients have been employed to diminish the inaccuracies of measurement induced by virtue of such variations. For example, weighing scales have been utilized to weigh livestock which is in constant motion on the load receiver, to measure the load of a dynamometer which tends to vary periodically, and to measure items moving over a load receiver as in a conveyor line. Among the techniques utilized to suppress the effects of the load variations for such usages is the employment of damping devices such as dashpots which gradually cut off to choke off variations imposed on the load receiver, clamps which engage the movable system at the limit of displacement, and indicator drive couplings which shift from a rapid response to a slow response whereby the load indication tends to center on the true load. Each of these techniques offer advantages and disadvantages which dictate their use in certain applications and preclude it in others.

When weighing of a discrete load is to be accomplished on a conveyor, particularly an automatically driven conveyor, the conditions for the introduction of the load to the weighing station cannot be controlled conveniently hence that introduction markedly alters the indicated load from the true load where the first scale swing is employed as the load measure as in those scales employing a limit clamp. Only a limited interval is available for measurement, hence, dashpots or other damping mechanisms are undesirable because of the time they require. Further, conveyor loads, particularly hanging loads are continually moving in complex patterns which produce periodic variations in the load which should be taken into account and effectively eliminated no matter what portion of the period is first effective on the load receiver.

In accordance with the above one object of this invention is to improve the operation of condition responsive devices.

Another object is to expand the flexibility of use for condition responsive devices.

A third object is to facilitate the accurate weighing of periodically varying loads.

A fourth object is to increase the speed and accuracy of weighing of loads which are in motion on a load receiver.

An additional object is to distinctly define signals characteristic of a condition to be sensed in an electrical system and to limit the response of the system to the interval such signals are effective.

These objects are realized in one embodiment of this invention described in detail below wherein a section of a conveyor is employed as a load receiver across which pendant loads are carried. The load receiver is coupled to a signal transducer which generates a signal which is a function of the instantaneous loading level. A plurality of signals representative of a single load are accumulated from the transducer and are averaged. Advantageously the load signals are electrical and a substantial number of such signals are generated and accumulated in a single period of the swing of the load while in the load receiver so that an average load for the period can be obtained from the accumulated total. Even greater accuracy can be achieved by measuring over several load swing periods. Thus, for loads having a period of about 1 second, highly accurate results have been obtained expeditiously by accumulating ten signals in about 2.5 seconds, transposing those signals to a form suitable for entry into decade counters and pointing off one decimal place to effect a division of the total by a factor of ten.

One feature of this invention resides in a combination of means to measure a quantity a plurality of times, means to accumulate those measurements and means to strike an average thereof.

Another feature involves means for effecting a number of measurements during a period of a periodically varying load and average those measurements.

An additional feature utilizes a scanner to develop a pulse train of a length which is a function of a condition being measured, a counter for those pulses, means to activate the counter at the beginning of a series of pulses, means to deactivate the counter at the end of a train of pulses a given number of trains following said activation, and means to average the accumulated pulse count over the given number.

A further feature of the invention when applied to electronically actuated measuring means involves means for actuating a circuit to be responsive to a train of pulses by means of a characteristic signal which distinguishes from spurious noise signals and avoids false responses.

The above and additional objects and features of this invention will be appreciated more fully from the following detailed description when read in conjunction with the accompanying drawings wherein:

FIG. I is a schematic representation of a fragment of a carcass conveyor incorporating a condition responsive device in the form of a weighing scale;

FIG. II is a front elevation with parts broken away showing a conventional weighing scale, load counterbalancing, and indicating mechanism equipped with a photoelectric scanning device for repetitively generating a series or train of pulses in which the number of pulses in each series is representative of the load then being indicated by the weighing scale, all as can be combined with the weighing section of the conveyor of FIG. I according to this invention;

FIG. III is an enlarged fragmentary elevation of the chart and mask used in the scanning device of FIG. II;

FIG. IV is a logic diagram showing the mode of utilizing the signals derived from the elements of FIGS. I, II and III according to this invention, and representing the several subcombinations and units of the circuits in this invention in block diagram form;

FIG. V is a schematic circuit diagram of the pulse utilization section represented by the upper rectangle of the diagram of FIG. IV which is embraced by dashed lines;

FIG. VI is a schematic circuit diagram of the control chassis of this system as represented in block diagram form in the lower rectangle embraced in dashed lines in FIG. IV;

FIG. VII is a schematic circuit diagram of a single section of one counter and a single decoder partially responsive to that section as utilized in this invention; and FIG. VIII is a series of wave forms representing the sequence of operations and the wave shapes produced at several of the significant locations in the system.

The application employed to illustrate this invention is a weighing scale for dressed carcasses as utilized in a packing house. As shown in FIG. I, the carcasses 11 are suspended on hooks 12 depending from trolley 13 which is coupled to a driving means, not shown, as by means of a chain, not shown, for movement along an overhead monorail conveyor 14. A weighing station integral with conveyor 14 is conditioned for the introduction of a trolley to a section of rail 15, hereafter termed a "live rail," upon which weighing operations are performed by displacing the arm 16 of limit switch LS1 when it is encountered by the trolley. When supplemental information such as grade information for the carcass, is to be employed by the utilization device or recorded it can be introduced from a keyboard manual input station (not shown) and registered in response to the actuation of switch LS1.

Live rail 15 is coupled through its hangers (not shown) as by conventional weighing scale linkages (not shown) to a conventional weighing scale head as shown in FIG. II. Since a significant portion of the displacement of rail 15 upon the introduction of the trolley 13 thereto may be attributable to the transfer or the conveyor drive, a period is allotted to the weighing system to permit it and the applied load to approach quiescence. The internal thus allocated is defined by the speed with which the drive moves trolley 13 along the conveyor and the length of rail between the threshold 17 of rail 15 and the position thereon where an arm 18 of a second limit switch LS2 is actuated by the trolley. Subsequent to operation of switch LS2, ten weighings of the carcass, tared to eliminate the trolley and any other extraneous loading of the rail, are made of an average struck.

Since the loads are pendulous and are moved along the conveyor in a manner to impart a swing motion, they develop a periodic variation in loading which is a function of the period of the swing. The center of mass of the several carcasses and their weight are of the same general magnitude so that their natural periods are about the same. Advantageously, weighing should be effected at a number of points in their swing over an exact period and averaged. This degree of exactness for each carcass is not practical and, therefore, the discrepancies introduced by the random timing of initiation of weighings in the swing of the load are substantially eliminated by insuring that a succession of weighings are performed in at least one cycle and advantaegously in two or more cycles of the load swing. It is to be noted that two cycles of load variation are experienced for each period of the load swing, for example, so that in one arrangement maximum loads are sensed at the bottom of the arc of swing and minimum loads are sensed at the limits of swing, the points where motion is reversed.

In the exemplary system the discrete loads, hog carcasses, have a natural swing period of about a second while on the trolley. They are weighed ten times after passing switch LS2 in an interval of 2.5 seconds thereby assuring an accurate average weight when it is struck by totaling the results of the ten weighings and dividing the total by ten.

Weighing of the load on live rail 15 can be accomplished by a number of condition responsive devices. A conventional pendulum type scale head suitable for combination with rail 15 as a load receiver is illustrated. As shown in FIG. II the weighing mechanism 19 is enclosed within a dial shaped housing 20 and includes a pair of pendulums 22 and 23 that are supported by flexible ribbons 24 in a well known manner from a sector guide 25. Load forces are applied to the pendulums through ribbons 26 trained over power sectors 27 from steelyard rod 28 which is coupled to the load receiver rail 15. The pendulums 22 and 23 swing outwardly and upwardly as load is applied, thereby elevating compensating bars 29 pivotally connected to the centers of rotation of the pendulums 22 and 23. The upward movement of the compensating bars 29 is transmitted to a rack 30 that meshes with a pinion, not shown, arranged to drive an indicator shaft on which an indicator 32 is mounted. The indicator 32 cooperates with indicia of a chart 33 to indicate the magnitude of the load being counterbalanced.

The geometry and dimensions of the system are arranged so that the upward movement of the compensating bar 29 is precisely proportional to the load imposed on the rail 15.

This scale head is adapted for the multiple weighings in rapid succession utilized in this invention by means of a signal translator which produces a signal which is a function of the load at the moment the translator is effective. The signal advantageously is generated in digital form as a series of electrical pulses of a number which is a function of the applied load. High speed operation and absence of extraneous loading from the translator is afforded by the use of photoelectric techniques. For example, pulses can be generated by means of a stationary graduated chart and a scanning device which is photoelectric in nature. Housing 34 atop housing 20 in FIG. II encases a photoelectric scanner 35 for translating weight magnitude to a pulse train of proportional length.

The scanner 35 includes an opaque stationary chart 36 having an array of translucent weight lines 37 as shown in FIG. III. A portion of the weight lines of the array is occluded by a mask 38 carried on a rod 39 coupled to the compensating bar 29 of the weighing mechanism so that the displacement of mask 38 and thus the number of weight lines 37 on chart 36 which are uncovered thereby is a function of the load applied to rail 15.

Details of the optical and photoelectric system utilized to scan the uncovered portion of chart and its mechanical structure are set forth in the copending application of Clarence E. Adler entitled "Indicator Scanning Device," Serial No. 553,457 (Pat. No. 2,938,126 issued May 24, 1960) which was filed December 16, 1955, as a continuation-in-part of an application filed August 11, 1955. The scanner includes a rotating member or turret 40 having a bifurcated portion (not shown) which straddles the chart 36 and overlapping mask 38 when rotating. This portion bears a light source (not shown) on one side of the chart producing a beam which is projected along the path 42 shown in dashed lines of FIG. III to a lens system (not shown) on the opposite side. From the lens, the light is directed to a photocell (not shown) by suitable optical means (not shown). Thus, as the member 40 is driven, as by motor 43 through belt 44, over path 42 those weight lines 37 of chart 36 which are revealed by displaced mask 38 permit pulses of light to be transmitted through the optical system and to the photocell. For example, if each pound caused the mask 38 to be displaced an amount sufficient to reveal one additional weight line 37 then a two hundred pound load would result in a series of two hundred light flashes on the sensitive element of the photocell for each scan and, in turn, a pulse train of two hundred pulses would issue from the cell.

One utilization of a pendulum type weighing scale with a photoelectric scanner in a manner somewhat analogous to the present is disclosed in copending Roger B. Williams, Jr., patent application Serial No. 592,938 (Pat. No. 3,052,409, issued Sept. 4, 1962) for "Read Out Equipment for Electronic Counter,' which was filed June 21, 1956. The details of those elements and their interrelationships are more completely set forth in that application which is incorporated herein for such details.

In addition to the showing of the location of the graduations or weight lines 37 on the chart 36 and their positions relative to the path 42 of the optical axis during a scanning operation, FIG. III also shows a group of start lines 45 which are adapted to produce a signal characteristic of the start of a scan operation. As with the weight lines 37, start lines 45 generate a train of pulses. This pulse train is of fixed length, for example of ten uniformly spaced pulses each of uniform length, and can be generated with each rotation of turret 40 even when the scale is unloaded since they are located on the chart beyond the zero position of mask 38. As will be seen, this start signal enables the positive operation of the counting mechanism associated with the scanner while avoiding false counts which might result from spurious signals, as might be introduced by inductive coupling from other circuits.

The utilization of the signals derived from limit switches LS1 and LS2 and from scanner 35 is shown in the logic diagram of FIG. IV. The present system performs ten weighings subsequent to the operation of limit switch LS2 and prior to the travel of trolley 13 from rail 15. These ten weighings involve ten scans of scanner 35 which produce ten start pulse trains and ten weighing pulse trains. The weighing pulse trains are segregated from the start pulse trains and are passed on to counters. Averaging is effected in the present ten scan system by pointing off one place in the total pulse count accumulated whereby the units pulses are accumulated in a decade counter designated a tenths counter, the tens count is recorded in a units counter, the hundreds count is recorded in a tens counter, and the thousands count is recorded in a hundreds counter. Each of these counters is arranged to actuate a respective decoder at the end of the tenth scan. The decoder can be of a number of forms, conveniently a relay type as illustrated, and can be fed to any of a number of utilization means such as a tape punch recorder, an adding machine or a typewriter.

When the trolley 13 has advanced along rail 15 to actuate limit switch LS2, that switch closes to trigger a bistable or flip flop circuit 46 by connecting its input to ground. At this time the scanner motor 43 and its light have been energized hence chart 36 is being scanned repeatedly. Pulses are being generated in the photocell of a form which is less than the optimum for counter ultization by each scan, and are being amplified as they are fed to amplifier 47 over lead 48. Assuming that the utilization device for the preceding weighing operation has completed its operations, relay K1 is deenergized and back contacts K1–2 are closed to enable the pulse shaper, blocking oscillator 49, which modifies the pulses to a form insuring proper operation of succeeding circuits in response thereto, and passes them over leads 50 and 51 to those circuits. The pulses are passed from amplifier 47 over lead 52. The shaped pulses are then fed from lead 50 to diode pulse counter 53 which amplifies the pulses and feeds them to scan gate generator 54 over lead 55. The start train of pulses are effective to trigger gate 54 and cause it to issue a start scan signal over lead 56.

The next start scan signal on lead 56 following the triggering of flip flop 46 by limit switch LS2 resets flip flop 46 which, in turn, issues a signal over lead 57 to a second flip flop circuit 58 to fire that circuit and issue a signal therefrom over lead 59. Reset amplifier 60 is fired by the signal on lead 59 to issue a reset signal to the tenths, units, tens, and hundreds decade counters 62, 63, 64 and 65 respectively, and to the scans decade counter 66 over lead 67. Thus all of the counters are reset to zero at the initiation of the first effective scan following the advance of a load to the weighing position.

Scan gate generator 54 also issues a signal over lead 68 and branch lead 69 which conditions gated amplifier 70 to pass the pulses of the weighing pulse train which follow the starting pulse train from blocking oscillator 49 to the tenths decade counter 62 over lead 72. An end-of-scan signal is also imposed on lead 68 shortly after the termination of the last weighing pulse in each scan, and is transmitted over branch lead 73 to the scans decade counter. Thus, a scan count is recorded at the end of each scan.

When the tenth scan count is recorded, scan counter 66 resets the second flip flop circuit 58 by issuing it a signal over lead 74. A signal is transmitted over lead 75 to multivibrator 76 as flip flop 58 is reset to energize a readout relay K1. Relay K1, when energized, opens contacts K1–2 in the shaper circuit 49 to lock it out thereby preventing the shaping and transmission of further pulses while the accumulated count is being utilized. It closes contacts K1–3 thereby enabling the decoders, as will be described in detail hereinafter, by closing a circuit to ground to remove a cut off bias imposed through lead 78 to tenths, units, tens and hundreds decoders 79, 80, 82 and 83 respectively. Further, it closes contacts K1–1 to initiate the operation of the utilization device. A hold circuit for relay K1 can be controlled by the utilization device to insure that the relay remains energized until the utilization cycle is completed and is thereafter released for another multiple weighing and averaging cycle as outlined above upon the tripping of limit switch LS2 by the next load.

The input shaper is shown in FIG. V. Bursts of light on the photocell result in signals which when amplified are fed over lead 52 with a generally spiked wave form as shown adjacent lead 52, to blocking oscillator 49. These voltage pulses are transmitted through coupling condenser 84 and grid current limiting resistor 85 to control grid 86 of a triode amplifier of the blocking oscillator. The junction between the coupling condenser 84 and resistor 85 is connected to ground through grid leak resistor 87 and a normally closed contact K1–2 as outlined above when the system is responsive to photocell signals and at other times is grounded through resistor 88 in series with resistor 87 to lock out signals on lead 52. Resistor 89 also in series with resistor 87 is connected to a common tube biasing source of about 150 volts negative through lead 90 and functions with resistor 88 in effecting the lock out of signals to the blocking oscillator while contact K1–2 is open.

The first operation in the shaping of a light burst induced voltage pulse is effected by way of the blocking oscillator comprising an amplifying triode section having a cathode 92 held at a potential intermediate the plate voltage on lead 93 and ground by the voltage divider made up of resistors 94 and 95 and anode 96 connected through a damping resistor 97 and the parallel plate winding 98 of a transformer 99 to lead 93. A second triode section is connected with its anode 100 in parallel with anode 96, its cathode 102 connected to ground through resistor 103, and its grid 104 connected to the control grid winding 105 of transformer 99 to provide the feedback for operation as a blocking oscillator. Thus a positive going pulse on lead 52 increases the plate current of the first triode section, drives the plate side of resistor 97 and primary winding 98 negative, and, through transformer 99, drives the control grid end of secondary winding 105 positive until the plate circuit is saturated at which point the grid 104 ceases to receive a feedback signal and the plate current diminishes. The resulting voltage signal at plate 100 is shown adjacent lead 51 and the voltage at the grid end of winding 105 is shown adjacent lead 50, each for a single pulse.

Current transients in the control grid circuit and secondary winding 105 are employed to sense the start of a scan. As shown in FIG. III the chart 36 comprises two groups of translucent indicia, a group of ten start lines 45 which are traversed by the optical scanner prior to the weight lines 37, and spaced therefrom along the path by greater than the usual interval between adjacent indicia, and the group of weight lines 37. Thus, at the initiation of each scan, ten pulses are fed to the shaper 49 which each produce a current transient as shown. The positive excursion of this transient flows through condenser 106 and resistor 107 to ground to develop a voltage on the anode 108 and control grid 109 of the diode connected triode of diode pulse counter 53. The diode conducts a portion of the current to ground through cathode resistor 110 and cathode 112 as a half wave rectifier, thereby periodically raising the potential at junction 113. This transient develops a charge on condenser 114 which is connected at its other terminal to resistor 115 and thence to the plate supply lead 93. Conveniently, condenser 106 can be of about 0.002 microfarad, resistor 107 can be of 150,000 ohms, resistor 110 can be of one megohm and condenser 114 can be of about 0.01 microfarad. Thus condenser 114 is charged by a series of pulses passed by the rectifier and of a magnitude determined by condenser 106 to build up a potential as a staircase wherein each light burst induced pulse adds a step along the charging curve of condenser 114 as shown in FIG. VIII. The voltage on condenser 114 is applied to grid 118 of scan gate generator 54 to gradually raise it to its threshold level and cause it to issue a start-of-scan signal. Condenser 117 which is substantially smaller than 114, e.g. 39 micro-microfarads, prevents transients during the feeding of increments to 114 from firing gate generator 54. Thus the threshold can be adjusted by the parameters of the circuit. Conveniently this threshold is attained on the seventh pulse in a ten pulse series of start pulses.

Initially the right hand triode section of scan gate generator 54 is in the conducting condition with control grid 119 biased for tube conduction by the voltage divider made up of resistors 120, 122 and 123 connected between the plate supply lead 93 and ground. In the quiescent state current flows through the triode from plate supply lead 93 through successively serially connected resistor 115, resistor 124, anode 125, cathode 126 and common cathode resistor 127 to ground. The voltage drop across cathode 127 in this condition is sufficient to maintain the voltage between control grid 118 and cathode 128 of the left hand triode section below the level cutting off the tube by the amount establishing the grid threshold at a seven pulse count as mentioned above.

When the grid 118 is raised to its threshold level A as shown in FIG. VIII current begins to flow between cathode 128 and anode 129 to effect a triggering action. Scan gate generator 54 is commonly known as a "Schmidt" trigger and is arranged so that it delivers rectangularly shaped output voltage pulses. As the potential at junction 130 is depressed by the plate current increase through resistor 120 it is transmitted by the parallel resistor 122 and capacitor 132 to grid 119 of the right hand triode. At this time the increase of current in common cathode resistor 127 has raised the potential of cathode 126. Thus a cumulative effect of reducing the potential of grid 119 while raising the potential of its cathode 127 tends to provide a snap action in cutting off the current in the right hand triode while the left hand triode experiences a similar sharp turn on to produce a sharp positive going pulse on lead 68 at the junction of anode 125, as shown in FIG. VIII, and resistor 124 and a sharp negative going pulse on lead 56 at the junction of anode 129 and resistor 120. The positive going signal at the junction of resistors 115 and 124 boosts the potential at grid 118 as shown in FIG. VIII. Condenser 132 in conjunction with resistor 122 determines the speed of recovery of the trigger wherein the right hand triode returns to its conducting state with a resultant negative going pulse on lead 68, while the left hand triode ceases to conduct and a positive going pulse appears on lead 56. This time constant is chosen so that the trigger recovers only between successive complete scans and not between the start scan train and the weight scan train. Thus, the decline from the level of the potential of grid 118 in the interval between the last start pulse and the first weight pulse shown at B of FIG. VIII does not extend to the threshold and does not permit the trigger to recover. The positive going pulse on lead 68 is employed to gate amplifier 70 over lead 69 so that it will pass weight pulses to the counter while the negative going pulse at the end of the scan is fed from leads 68 and 73 to the scan counter 66. The negative going pulse on lead 56 at the start of the first scan is fed to the first flip flop in the control chassis to initiate the operation of the unit as outlined.

Amplifier 70 is gated to pass weight pulses received from blocking oscillator 49 over lead 51 to counter 62 over lead 72 by reducing the cathode to control grid 133 potential of the amplifier tube from a level at which the plate current responds to none of the signals from the anodes 96 and 100, as imposed across cathode resistor 134 on cathode 135, to one which does respond to such signals. In the quiescent state, before scan gate generator 54 has been triggered, grid 133 is held at a voltage substantially below ground through a voltage divided between the plate supply lead 93, which is substantially above ground, and the bias supply lead 90, which is substantially below ground, through resistors 115, 124, 136 and 137. Resistor 137 is shunted by a neon lamp 138 and resistor 139 to the bias supply lead and the control grid 133 is tapped off between lamp 138 and resistor 139. When the scan gate generator is triggered, a positive going signal is imposed at junction 140 from lead 68 through resistor 136 while a negative going signal is imposed on that junction from anode 129 through resistor 142 and coupling condenser 143. The magnitudes of the plate resistances 120 and the combination of 115 and 124 are about equal so that the respective positive and negative going plate signals are of about the same magnitude. However, the magnitude of resistors 136 and 142 and of condenser 143 are chosen so that initially junction 140 is driven further negative than the level established by resistors 115, 124, 136 and 137 when the circuit is quiescent. Resistor 142 is about 20% of resistor 136. Condenser 143 restricts the contribution of plate 129 to the signal at junction 140 to transients. Therefore, the potential recovers and, due to the maintenance of the plateau signal from lead 68, becomes more positive than during the quiescent state with a time constant determined by the magnitudes of resistor 142 and condenser 143.

As the potential rises at junction 140 it tends to raise the grid potential of grid 133 above ground due to the increased current through neon lamp 138 and resistor 139 and the drop across that resistor. However, diode 144 shunts to ground any current in excess of that required to raise the grid to ground since it becomes forwardly biased. Thus, after a start-of-scan signal has triggered generator 54, the potential on grid 133 is properly related to that on cathode 135 so that the amplifier 70 is gated to pass weight pulses. It should be noted at this point that the generator 54 was triggered on the seventh of ten pulses. If amplifier 70 were enabled at the instant the gate was triggered three of the start pulses would be counted as weight pulses. This is avoided by the time constant of the gating circuit outlined above. The threshold for the amplifier requires a grid voltage at a given level C, as seen in FIG. VIII, above the quiescent level. The initial reduction and gradual positive swing are so related to the interval in which the last three start pulses are effective as to maintain the amplifier below its threshold level until they have passed, yet this constant is adjusted to enable the amplifier before the first weighing pulse is passed. These time constants and sequences are readily adjustable by techniques well known in the art.

The blocking oscillator pulses considered thus far were derived from the grid circuit. Those pulses formed as shown adjacent lead 51 in FIG. V and appearing in the circuits of plate 100 are transmitted to the amplifier 70 and, when gated to pass amplified pulses, from thence to the weight counters. The pulses are effective to depress the potential of cathode 135 during the negative portion of the blocking oscillator cycle as coupled to the cathode through resistor 145 and condenser 146. This effectively increases the grid-cathode voltage in a conducting direction and causes a pulse of current to flow from lead 93 through plate resistor 147, plate 148, cathode 135 and resistor 134 and, in turn, generates a negative going spike on lead 72. Rectifier 149 prevents the cathode 135 from being driven negative.

In operation, the scanner continuously transmits pulses to the amplifier. If no weight is applied to the load receiver, all of the weight lines are occluded and if contact K1–2 is closed the system merely receives a succession of start signals which have no effect until the control system has been actuated. These control circuits are shown in FIG. VI.

When a trolley 13 advances along live rail section 15 and encounters the actuator 18 of limit switch LS2 it momentarily connects the input of flip flop 46 to ground. The flip flop or bistable trigger 46 comprises a pair of triodes 150 and 152 arranged so that the left hand triode 150 is normally conducting. A common plate supply lead 153 interconnected to a common ground lead 154 affords the several bias levels required in the control chassis. The flip flop cathodes 155 and 156 are grounded through a common cathode resistor 157 and a by-pass condenser 158, and its plates 159 and 160 are connected to the plate supply lead 153 through individual plate resistors 162 and 163. The input grid 164 for LS2 is normally in conducting condition by virtue of its bias acquired from the voltage divider comprising plate resistor 163, resistor 165 and resistor 166 while grid 167 is held non-conducting by virtue of the voltage divider comprising the plate resistor 162 of conducting triode 150, resistor 168 and resistor 169. The connection of input grid 164 to ground through limit switch LS2, resistor 170 which is small compared to resistor 166, rectifier 172, and condenser 173, momentarily reduces the voltage on grid 164 by passing a transient to ground through that path from the relatively large condenser 161. This reduces the voltage on the left terminal of rectifier 172. No current flows through rectifier 172 until the voltage is reduced below the voltage on its right terminal as determined by the voltage divider comprising resistors 171a and 171b. This reduction is sufficient to pass current through rectifier 172 and to trigger the flip flop so that triode 150 becomes non-conducting and triode 152 becomes conducting. Thus, plate current through 162 is reduced to raise the voltage on grid 167 through parallel resistor 168 and condenser 174 to a level initiating plate current in triode 152 and resistor 163. The plate voltage of triode 152 is thereby depressed to further depress the voltage on grid 164 through resistor 165 and parallel condenser 175, thereby locking the flip flop with triode 152 conducting and triode 150 nonconducting.

The negative going pulse generated in the left hand section of scan gate generator in response to the next start scan signal following the setting of flip flop 46 with triode 152 conducting conditions the circuits for a weighing operation. That pulse as shown in FIG. VI is fed over lead 56, differentiated by condenser 176 and resistor 177 and its negative spike is transmitted through coupling condenser 178 to grid 167. Its positive going spike at the end of the negative signal plateau on lead 56 has no effect since it is clipped by passing it to ground lead 154 through rectifier 179. The negative going spike on grid 167 resets the flip flop by reducing the plate current in triode 152 to raise the voltage of grid 164 and institute plate current in triode 150 whereby triode 150 rapidly becomes conducting while triode 152 rapidly ceases conduction.

Initiation of conduction in triode 150 creates a negative going signal on lead 57 extending to the input grid 180 of second flip flop 58 through coupling condenser 181. Flip flop 58 corresponds in many respects to flip flop 46. It has balanced circuits for a pair of triodes 182 and 183 including equal plate resistors 184 and 185 coupled to respective plates 186 and 187 from plate supply lead 153. Its respective cathodes 188 and 189 are grounded through a common cathode resistance 190 and a by-pass condenser 192. Grid bias for control grids 180 and 193 is developed by like voltage dividers each comprising a plate resistor 184 or 185, a coupling resistor 194 or 195 and a grid bias resistor 196 or 197. Normally, right hand triode 183 is conducting and left hand triode 182 is nonconducting by virtue of a preceding tenth pulse from the scan counter in a preceding weighing operation fed over lead 74.

The negative going signal on lead 57 at the time flip flop 46 is reset is differentiated by resistor 198 and condenser 181 and fed to grid 180 as a negative going spike to trigger flip flop 58. In the manner detailed above for flip flop 46, triode 183 is shifted to its nonconducting state and triode 182 enters conduction. Condenser 191 couples plate 186 to ground to prevent response to sharp transients, hence, conduction in triode 182 is delayed slightly without adverse effects by condenser 191. Flip flop 58 remains in this condition until ten weighings have been completed. Accordingly, it is arranged to be nonresponsive to any positive going spike on lead 57 during this interval by virtue of the clipping rectifier 200 which passes such spikes to ground. Indication that a weighing operation is under way is afforded by a neon lamp indicator 202 connected through resistor 203 from ground to plate 187 so that it glows brightly when triode 183 is nonconducting and glows dimly or is extinguished when triode 183 is conducting.

The positive going signal generated as triode 183 is shifted to its nonconducting state is conveyed over lead 59 from plate 187 to reset amplifier 60. It is passed through coupling condenser 204 and current limiting resistor 205 to control grid 206 of thyratron 207. Normally thyratron 207 is held nonconducting by the negative bias imposed on grid 206 by current flowing from lead 90 through resistor 208 and resistor 209 to ground. The positive pulse on lead 59 overcomes the bias sufficiently to permit tube 207 to initiate conduction. Current flows through cathode resistor 210, cathode 212, plate 213 and plate resistor 214 thereby raising cathode 212 somewhat above ground to produce a positive spike on output lead 67 connected between cathode 212 and resistor 210. Plate 213 is connected to ground through a relatively large condenser 215 so that the plate voltage does not drop immediately to the low levels and the output spike has a gradual rise. When the plate potential does decline at the peak of the output spike and the cathode potential reaches its maximum, the control grid transient has dissipated and the grid bias is again below cut off hence the tube is returned to its nonconducting state with a gradual decline which is somewhat flatter than the spike rise as shown adjacent lead 67 in FIG. V.

The reset spike generated at the beginning of the first scan in a ten weigh cycle of this equipment is employed to reset to zero count each of four counter flip-flop stages in the scans, and weight counters 66, 62, 63, 64 and 65. Decade counters of this nature have been disclosed in the aforenoted Roger B. Williams, Jr., United States patent application Serial No. 592,938 and accordingly will not be set forth herein. A typical stage of the four present in each counter is shown in the lower portion of FIG. VII. It comprises two triodes 216 and 217 having a common plate resistor 218, individual plate resistors 219 and 220, plate to grid resistors 222 and 223, and grid to ground resistors 224 and 225 (via lead 67 and resistor 210). Weight pulses or pulses from preceding stages or decade counters responsive to weight pulses on lead 72 in the case of the weight counters and end-of-scan pulses or pulses from preceding stages responsive to scan pulses on lead 73 in the case of scan counter 66 are fed to the counter stage through an input coupling condenser 226. Plate to grid condensers 227 and 228 are connected across resistors 222 and 223 respectively. A common cathode resistor 229 shunted by a cathode by-pass condenser 230 extends between cathodes 232 and 233 and ground. Each triode 216 and 217 has its plates 234 or 235 connected to the junction between the resistors 223 and 220 or 222 and 219, respectively, and its control grid 236 or 237 connected to the junctions between resistors 222 and 224 or 223 and 225, respectively. When this circuit is assembled with the proper values for resistors and condensers, it is bistable in that it will assume a state where either triode section may be conducting current and the other cut off. Suitable resistance values for the various resistors are, for the common plate resistor 218, 25,000 to 30,000 ohms; for the individual plate resistors 219 and 220, 45,000 to 50,000 ohms; for the plate to grid resistors 222 and 223, 250,000 to 300,000 ohms; for the grid to ground resistors 224 and 225, 100,000 ohms; and for the cathode resistor 229, 12,000 to 14,000 ohms. The input condenser 226 and the plate to grid condensers 227 and 228 are preferably in the order of 50 micro-microfarads while cathode by-pass condenser 129 is in the order of $1/100$ of a microfarad.

For resetting the counter stage to place the right hand section in a conducting state and the left hand section nonconducting, the right grid return resistor is connected to lead 67 and thus to ground through resistor 210 which may be about 150 ohms. Thus for normal counting operations resistor 225 behaves as if it were connected to ground. When the thyratron issues a resetting pulse, the positive voltage applied through the lead 67 drives the right control grid 237 positive so as to draw current through the right half of the twin triode, thereby establishing that as the conducting side. This action also causes the left side to become nonconducting. The application of a pulse through condenser 226, as results from a weight pulse over lead 72 or an end-of-scan pulse over lead 73, by driving the plates negative and then allowing them to return to their normal voltage, causes the conduction to transfer. Initially this places left triode in conduction and terminates conduction in right triode. A subsequent pulse across condenser 226 shifts the flip flop again thereby returning it to its initial state and issuing a pulse to a succeeding counter stage.

The four stage binary counter made up of stages as described normally counts to 16 as indicated by the state of conduction in the several stages. The first stage changes at every pulse received and goes through a cycle for two pulses, the second stage goes through a cycle for each two pulses from the first stage or every four cycles at the counter input, the third stage goes through a cycle for eight impulses and the fourth stage for sixteen impulses. Recycling of the fourth stage and thus the entire counter is accomplished with ten impulses for a decade counter by feeding back a reset signal to set the counter ahead at appropriate points. In one utilization the fourth impulse operates the third stage which is coupled to the second stage to place it with its left section conducting and thereby set the counter at a binary count of six on the fourth count. Further, two pulses later, at the sixth impulse, the fourth stage is triggered and a signal is fed back to the third stage to place its left side in conduction and produce a binary count of twelve. The remaining four counts or a total of ten counts recycle the counter by setting all left sections nonconducting.

The tenths, units, and tens counters 62, 63 and 64 as they are recycled pulse a succeeding decade counter 63, 64 and 65 respectively to count a carry operation. The scans counter 66 issues a negative going pulse over its output lead 74 as it counts the end of the tenth scan and thus as ten weight counts are completely accumulated in the weight counters. This negative going pulse is differentiated by condenser 234 and resistor 235 and the resultant negative spike is passed through condenser 236 to grid 193 of conducting triode 182 in flip flop 58. This resets flip flop 58 by placing triode 182 in a nonconducting state and triode 183 in conduction. Positive going signals on lead 74 are shunted to ground through rectifier 237 forming a clipper, so that false operation of flip flop 58 is avoided.

As a result of the resetting of flip flop 58, decoders 79, 80, 82 and 84 are rendered effective, further weight pulses are locked out and the utilization device or devices coupled to the system are activated. This is effected through a mono-stable or one shot multivibrator 76 shown in the right portion of FIG. VI which is actuated by the negative going pedestal of voltage on lead 75 resulting from the initiating of conduction in triode 183 and imposing a negative pulse on input grid 238 through coupling condenser 239. The multivibrator 76 sustains a signal in response to this pulse for an interval sufficient to actuate relay K1 and seal it in, for example for 150 milliseconds, and thereafter reverts to its initial state.

The multivibrator 76 comprises a dual triode having first and second cathodes 240 and 242 grounded through a common cathode resistor 243 and has its plates 244 and 245 connected through resistors 246 and 247 to plate supply lead 153. The grid 238 is connected to the plate supply lead 153 through grid resistors 248 and 249. Thus the left half of the dual triode normally draws plate current and the resistance of the plate resistor 246 and the voltage drop across cathode resistor 243 is sufficient to hold the right side of the tube at current cut off. Normally plate 245 is at the potential of plate supply lead 153 while plate 244 is at a considerably more negative level.

Upon receipt of the negative going signal on the left grid 238, the left side of the tube becomes nonconducting so as to transmit a positive going signal voltage from its plate 224 through lead 250 and resistor 252 to the control grid 253 of buffer amplifier 254. This amplifier in turn conducts plate current to energize relay K1 and actuate the several terminating functions of a weighing cycle. The positive voltage signal on lead 250 is also applied through resistor 255 of a voltage divider comprising resistors 255 and 256 and thence to the grid 257 of the right triode. The right side then conducts between cathode 242 and plate 245 to reduce the potential at junction 258 between plate 245 and resistor 247. Condenser 259 is initially uncharged and is at the plate supply voltage since virtually no current flows in either of resistors 249 or 247 until the right triode conducts. Condenser 259 is of about 0.1 microfarad while resistor 249 is about 2.2 megohms and resistor 248 is about 150 kilo-ohms. Thus, condenser 259 initially draws sufficient current to maintain grid 238 cut off. When its charge builds up to a predetermined value, arranged to occur 150 milliseconds after grid 238 was biased to cut off, the condenser-resistance combination raises the bias of grid 238 to its conduction level to initiate conduction in the left triode and, by virtue of the drop in voltage at plate 244, to depress the bias in grid 257 to cut off the right triode.

When the multivibrator reverts to its original state, buffer amplifier 254 ceases to pass plate current sufficient to hold relay K1 energized. At this time, however, relay K1 has been energized for a sufficient interval to place in operation the equipment responsive to the average weight. Relay K1 is energized through an alternate path including utilization device contact UD and a resistor 260 as long as that equipment is responding to the average weight and thus until a utilization cycle is completed.

Relay K1 when energized, opens contact K1–2 so that the input to grid 86 is biased to cut off and no pulse signals received from subsequent scans and fed through the scanner preamplifier are effective in the blocking oscillator 49 of the shaper. Changes in the subsequent sections of the control and scan delineating and weight pulse counting circuits are thereby barred.

The accumulated pulse count from the ten weight pulse trains as fixed in the counter is utilized by sensing the count therein, decoding that sensed count, and operating a utilization device in response to the decoded count. No utilization device is shown since details of that equipment are not a part of this invention, numerous devices such as printers, tape punch machines, other forms of recording units, adding machines, typewriters, and remote display indicators are typical. One or more utilization devices are conditioned for response to the weight by the closing of contact K1–1 as shown in FIG. IV. Information is fed from decoders 79, 80, 82 and 83 to the utilization device in response to decoder actuation by the closing of contact K1–3 as is best appreciated from a consideration of FIG. VII.

The count stored or accumulated in the various decades of the electronic counter at the end of each train of pulses is sensed electrically on output lead 262. Each output lead is connected through a resistor 263 of about 1 megohm resistance through resistor 264 of about 70,000 ohms to grid 265 of a triode amplifier stage 266 individual to that counter stage. In order to take full advantage of the signal swing in the counters the decoders are permitted to float by connecting their cathodes to a voltage divider comprising resistor 267 from the plate supply 268 for the counter through common lead 269 to grounded resistor 270. In the exemplary circuit the swing on grid 265 is from about +70 when the right side of the counter is conducting to about +150 when that side is nonconducting. In order to lock out the decoders their cathodes are held at about 200 volts positive and they are rendered responsive by reducing the cathode voltage to about 90 volts positive by closing contact K1–3 to parallel resistor 270 with resistor 272. In the example, with a supply 268 of +300 volts resistor 267 may be about 100,000 ohms, resistor 270 may be about 220,000 ohms, and resistor 272 may be about 47,000 ohms.

Thus, when relay K1 is energized to close contact K1–3, cathode 273 of amplifier 266 is reduced in voltage sufficiently to permit plate current to flow therein when the counter is in the on condition, represented by conduction in the left side thereof while no current flows in the amplifier if the right side of the counter is conducting. Plate current in amplifier 266 energizes a relay 274 to close a circuit from terminal 275 to lead 276. Similarly the other three stages (not shown) of a decade weight counter actuate amplifiers 277, 278 and 279 to energize respective relays 280, 282 and 283 when the count is such as to place them in their on condition. It will be noted that ten terminals connected through the relay contacts are shown on terminal strip 284. These terminals are assigned to the several decimal counts which can be registered in the counters to provide any count from 0 to 9.

In the ten weigh system as described an average is struck automatically when the count is recorded and decoded in a decimal system since one decimal order or place can be set off at the decoder terminals whereby ten counts must be accumulated for each count applied to the utilization device through the decoders.

At the end of a utilization cycle contact UD of FIG. V reopens to deenergize relay K1. Contacts K1–1 and K1–3 then open to prevent further operation of the utilization device and to lock out the decoders until the end of the tenth scan of the next weighing cycle. Contacts K1–2 close to enable shaper 49 to respond to pulses on lead 52 to complete the conditioning of the system for a succeeding weighing.

In summary, this invention embraces a condition responsive system which has been specifically illustrated as a conveyor having an integral weighing scale which measures a condition a plurality of times during one or more periods of variation, accumulates the measurements, and strikes an average thereof. As a conveyor weighing scale the system has been disclosed with a load carrying element, trolley 13, which is movable along a conveyor, rail 14, and into a weighing station, live rail section 15, which is a portion of the conveyor. A first bistable trigger circuit, flip flop 46, is triggered in response to the presence of trolley 13 on section 15 when limit switch LS2 is actuated to initiate a weighing cycle. An optical scanner 35 cooperating with an opaque chart 36 and a mask 38 which is displaced along the chart as a function of the load on load receiver, rail 15, constitutes means to generate repetitively a start pulse train of fixed length in a given interval, by virtue of ten translucent lines 45 on chart 36 which are scanned in a given interval, and a following weight pulse train of a length which is a function of the weight imposed on the load receiver. The resulting start pulses form a start-of-scan train or characteristic signal which is of a length distinct from the sharp transient spurious signals to which the system is subject as by undesired inductive coupling to its leads. A plurality of start pulses form a signal having a duration in excess of these individual spurious signals thereby avoiding false operation in response to spurious signals.

The start signal is recognized by means responsive to a given number of pulses, scan gate generator 54, which includes means to accumulate an electrical charge for each successive pulse, condenser 114, and signal means responsive to an accumulation of a predetermined electrical charge and thus a predetermined pulse count in the form of the Schmidt trigger including the two triodes having plates 125 and 129. Means responsive to the start signal means reset the bistable trigger circuit 46 so that a second bistable trigger circuit or flip flop 58 is triggered.

The Schmidt trigger sustains its triggered condition for an interval greater than that between successive pulses in a train or between a start train and its weight train. However, it is reset a given interval following the cessation of pulses and thus at the end of each weight train, and it thereby constitutes means to generate a signal at the end of each train of weight pulses. An end-of-train signal counter 66 is provided as is a first counter for accumulating weight pulses, the four decade counters 62, 63, 64 and 65.

In order to condition the system for a weighing, a reset signal generator 60 is provided and cooperates with means responsive to the triggering of the second bistable trigger circuit 58 for actuating the reset signal generator to reset the first counter 62, 63, 64 and 65 and the end-of-train signal counter 66.

A gate 70 for coupling the pulse generating means to the first counter is actuated to pulse-coupling-condition by means responsive to the start signal means upon expiration of a time delay in excess of the remainder of the start pulse train length. This enables the counters to count only the pulses of the weight train while assuring that the operating margin of the start signal generator is attained with some safety factor. Thus if ten start pulses are employed and the start signal is effective on the seventh pulse, the delay is sufficient to prevent the opening of the gate 70 until the three terminal pulses of the start train have been completed yet not so great as to bar passage to the counter of the first weight pulse.

Weight pulse counting is terminated by means responsive to a predetermined count in the end-of-train signal counter 66 for resetting the second flip flop 58, and means responsive to the resetting of the flip flop for barring the accumulation of additional pulses in the first counter and for utilizing the accumulated count in the first pulse counter. This last means has been illustrated as a relay K1 which blocks scanner pulses at shaper 49 by opening contact K1–2 so that none are passed through the shaper to the counter, which actuates decoders 79, 80, 82 and 83 by closing contact K1–3 to cause them to operate in response to the count then in the counters, and which actuates the utilization device by closing contact K1–1.

While a specific condition responsive element, a weighing scale of particular form, and while specific circuits have been disclosed, it is to be understood that the system set forth herein is intended only to illustrate the invention. One skilled in the art might readily modify the elements and subcombinations, including certain of the novel subcombinations, or substitute other elements and subcombinations without departing from the spirit and scope thereof. Accordingly, this disclosure is not intended to limit the scope of the invention.

What is claimed is:

1. A weighing scale, a load receiver, means to generate repetitively a start pulse train of fixed length and a following weight pulse train of a length which is a function of the weight imposed on the load receiver, means operatively connected to accumulate an electrical charge from said train of successive start pulses, a bistable trigger circuit, a first counter for accumulating pulses, a gate for coupling said pulse generating means to said first counter, means generating a signal in response to the cessation of each train of weight pulses of said pulse generating means, an end-of-train signal counter operatively connected to said signal generating means, a reset signal generator, a signal means responsive to an accumulation of a predetermined electrical charge in said accumulating means, means to trigger said bistable circuit in response to said signal means, means responsive to the triggering of said circuit for actuating said reset signal generator to reset said first counter and said end-of-train signal counter, means responsive to said signal means upon expiration of said start pulse train for actuating said gate to pulse coupling condition, means responsive to a predetermined count in said end-of-train signal counter for resetting said trigger circuit, and means responsive to the resetting of said circuit for barring the accumulation of additional pulses in said first counter and for utilizing the accumulated count in said first pulse counter.

2. A weighing scale, a load receiver, means to generate repetitively a start pulse train of fixed length and a following weight pulse train of a length which is a function of the weight imposed on the load receiver, a bistable trigger circuit, a first counter for accumulating pulses, a gate for coupling said pulse generating means to said first counter, means generating a signal in response to the cessation of each train of weight pulses of said pulse generating means, an end-of-train signal counter operatively connected to said signal generating means, a reset signal generator, signal means responsive to a predetermined plurality of pulses, means to trigger said circuit in response to said signal means, means responsive to the triggering of said circuit for actuating said reset signal generator to reset said first counter and said end-of-train signal counter, means responsive to said signal means upon expiration of said start pulse train for actuating said gate to pulse coupling condition, means responsive to a predetermined count in said end-of-train signal counter for resetting said trigger circuit, and means responsive to the resetting of said circuit for barring the accumulation of additional pulses in said first counter and for utilizing the accumulated count in said first pulse counter.

3. A weighing scale comprising, a load receiver, means to generate repetitively a start pulse train of fixed length and a weight pulse train having a length which is a function of the weight imposed on the load reeciver, a bistable trigger circuit, a first counter for accumulating pulses, a gate for coupling said pulse generating means to said first counter, means generating a signal in response to the cessation of each train of weight pulses of said pulse generating means, an end-of-train signal counter operatively connected to said signal generating means, a reset signal generator, means to trigger said circuit in response to an initial predetermined plurality of pulses for actuating said reset signal generator to reset said first counter and said end-of-train counter, means to actuate said gate to pulse coupling condition in response to a predetermined plurality of pulses, means responsive to a predetermined count in said end-of-train signal counter for resetting said trigger circuit, and means responsive to the resetting of said circuit for barring the accumulation of additional pulses in said first counter and for utilizing the accumulated count in said first counter.

4. A weighing scale comprising, a load receiver, means repetitively generating a pulse train having a length which is a function of the weight imposed on the load receiver, means periodically producing a start signal preceding each pulse train, a bistable trigger circuit, means to trigger said circuit in response to an initial start signal, a counter for accumulating weight pulses in successive trains, means generating a signal in response to the cessation of each train of pulses of said pulse generating means, an end-of-train signal counter operatively connected to said signal generating means, a reset signal generator means responsive to the triggering of said circuit for actuating said reset signal generator to reset said train pulse and said end-of-train signal counters, means responsive to a predetermined count in said end-of-train signal counter for resetting said trigger circuit, and means responsive to the resetting of said circuit for barring the accumulation of additional pulses in said train pulse counter and for utilizing the accumulated count in said train pulse counter.

5. A conveyor weighing scale comprising, a load carrying element movable along said conveyor, a weighing station along said conveyor, a first bistable trigger circuit, means to trigger said first circuit in response to the presence of said element in said station, means repetitively generating a pulse train having a length which is a function of the weight of load in said station, means periodically producing a start signal preceding each pulse train, means to reset said first trigger circuit in response to the next start signal following the triggering thereof, a second bistable trigger circuit, means to trigger said second circuit in response to the reset of said first circuit, a reset signal generator, a counter for accumulating pulses in successive trains, means generating a signal in response to the cessation of each train of pulses of said pulse generating means, an end-of-train signal counter operatively connected to said signal generating means, means responsive to the triggering of said second circuit for actuating said reset signal generator to reset said train pulse and end-of-train counters, means responsive to a predetermined count in said end-of-train counter for resetting said second trigger circuit, and means responsive to the resetting of said second trigger circuit for barring the accumulation of additional pulses in said train pulse counter and for utilizing the accumulated count in said train pulse counter.

6. A conveyor weighing scale comprising a load carrying element of a conveyor, a weighing station along said conveyor, first means responsive to the presence of said element in said station, means for weighing a continuously moving load a plurality of times while in said station, a scanner for said weighing means repetitively generating a train of weight pulses characteristic of the then current load weight, means for generating in accordance with a predetermined plurality of weighing times a characteristic starting signal which precedes each train of weight pulses, a weight pulse counter, means for transmitting weight pulses to said counter, means responsive to the first characteristic signal subsequent to the actuation of said first means for conditioning said transmitting means to transmit weight pulses to said counter, a signal generator responsive to the cessation of a train of weight pulses, a second counter for signals from said signal generator, means responsive to a count in said second counter equal to the plurality of weighings desired for barring transmission of subsequent weight pulses to said counter and means responsive to said predetermined count in said second counter for utilizing the weight pulse count accumulated in said counter.

7. A conveyor weighing scale comprising a load carrying element of a conveyor, a weighing station along said conveyor, first means responsive to the presence of said element in said station, means for continuously weighing a load while in said station, a scanner for said weighing means repetitively generating a train of weight pulses characteristic of the then current load weight, means for generating periodically a characteristic starting signal which precedes each train of weight pulses, a weight pulse counter, means for transmitting weight pulses to said counter, means responsive to the first characteristic signal subsequent to the actuation of said first means for conditioning said transmitting means to transmit weight pulses to said counter, a signal generator responsive to the cessation of a train of weight pulses, a second counter for signals from said signal generator, means responsive to a predetermined count in said second counter for barring transmission of subsequent weight pulses to said counter, means responsive to said predetermined count in said second counter for utilizing the pulse count accumulated in said weight pulse counter, and a reset signal generator for resetting said weight pulse counter and said second counter in response to the first characteristic starting signal following the operation of said first means.

8. In a condition responsive element, means to generate a start pulse train of fixed length and a following condition pulse train of a length which is a function of the response of said element, means to accumulate an electrical charge for each of successive start pulses, a counter, a gate for coupling said pulse generating means to said counter, and means responsive to a predetermined charge accumulation in said accumulating means for actuating said gate to pulse coupling condition.

9. In a condition responsive element, means to generate a start pulse train of fixed length and a following condition pulse train of a length which is a function of the response of said element, means to accumulate an electrical charge for each of successive start pulses, a counter, a gate for coupling said pulse generating means to said counter, signal means responsive to a predetermined charge accumulation in said accumulating means, and means responsive to said signal means upon expiration of said start pulse train for actuating said gate to pulse coupling condition.

10. In a condition responsive device, an element displaced as a function of the condition to which said device is responsive, means to scan said element repeatedly, an electrical transducer producing a discrete series of electrical pulses which is of a length which is a function of the displacement of said element for each scan, means to accumulate the number of pulses produced, a scans counter effective upon reaching a predetermined number of scans to prevent further accumulation of pulses by said accumulating means, and means to divide the accumulated pulses by the predetermined number of scans.

11. In a device responsive to a condition having periodic variations, an element displaced as a function of the then current condition to which said device is responsive, means repeatedly to scan said element in an interval which is of a lower order of magnitude than said condition period, an electrical transducer producing a discrete signal for each scan which is a function of the displacement of said element, means to accumulate said repeatedly produced signals, a scans counter operatively connected to said scanning means and effective upon reaching a predetermined number of scans to prevent further accumulation of signals by said accumulating means, and means to average the accumulated signals over predetermined number of scans.

12. In a weighing scale for measuring periodically varying loads, an element displaced as a function of the then current load on the scale, means to scan said element in an interval which is of a lower order of magnitude than said load variation period, an electrical transducer producing a discrete series of electrical pulses which is of a length which is a function of the displacement of said element for each scan, means to accumulate the number of pulses produced over an interval embracing at least one period of variation of said load, a scans counter effective upon reaching a predetermined number of scans to prevent further accumulation of pulses by said accumulating means, and means to divide the accumulated number of pulses by the predetermined number of scans.

References Cited in the file of this patent

UNITED STATES PATENTS

| | | |
|---|---|---|
| 2,078,792 | Fitz Gerald | Apr. 27, 1937 |
| 2,114,016 | Dimond | Apr. 12, 1938 |
| 2,374,248 | Tuttle | Apr. 24, 1945 |
| 2,489,860 | Carlin | Nov. 29, 1949 |
| 2,507,854 | De Lano | May 16, 1950 |
| 2,558,447 | MacSorley | June 26, 1951 |
| 2,623,389 | Oosterom | Dec. 30, 1952 |
| 2,670,463 | Raymond | Feb. 23, 1954 |
| 2,678,206 | Maldoon | May 11, 1954 |
| 2,686,008 | Davidson | Aug. 10, 1954 |
| 2,688,459 | Merrill | Sept. 7, 1954 |
| 2,764,399 | Porter | Sept. 25, 1956 |
| 2,803,448 | Biebel | Aug. 20, 1957 |
| 2,812,171 | Charbonnier | Nov. 5, 1957 |
| 2,815,480 | Ruge | Dec. 3, 1957 |
| 2,831,348 | Kritz | Apr. 22, 1958 |
| 2,859,616 | Fellows | Nov. 11, 1958 |
| 2,860,867 | Allen | Nov. 18, 1958 |
| 2,971,697 | Harter | Feb. 14, 1961 |
| 2,974,863 | Williams | Mar. 14, 1961 |

FOREIGN PATENTS

| | | |
|---|---|---|
| 571,003 | Great Britain | Aug. 1, 1945 |